(12) United States Patent
Warashina et al.

(10) Patent No.: US 9,969,090 B2
(45) Date of Patent: May 15, 2018

(54) ROBOT SYSTEM EQUIPPED WITH CAMERA FOR CAPTURING IMAGE OF TARGET MARK

(71) Applicant: FANUC CORPORATION, Yamanashi (JP)

(72) Inventors: Fumikazu Warashina, Yamanashi (JP); Keisuke Watanabe, Yamanashi (JP); Kenshirou Oono, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/281,091

(22) Filed: Sep. 30, 2016

(65) Prior Publication Data

US 2017/0095930 A1 Apr. 6, 2017

(30) Foreign Application Priority Data

Oct. 5, 2015 (JP) ................. 2015-197715

(51) Int. Cl.
*B25J 9/18* (2006.01)
*B25J 9/16* (2006.01)

(52) U.S. Cl.
CPC ........... *B25J 9/1697* (2013.01); *B25J 9/1664* (2013.01); *B25J 9/1692* (2013.01); *G05B 2219/37561* (2013.01); *G05B 2219/40003* (2013.01)

(58) Field of Classification Search
CPC ...... B25J 9/1697; B25J 9/1664; B25J 9/1684; B25J 9/1692; B25J 19/02; B25J 19/022; B25J 19/023; G05B 2219/37555; G05B 2219/37561; G05B 2219/39397; G05B 2219/40003; Y10S 901/47

See application file for complete search history.

(56) References Cited

U.S. PATENT DOCUMENTS

| 2004/0189631 | A1 | 9/2004 | Kazi et al. | |
| 2005/0159842 | A1* | 7/2005 | Ban | B25J 19/023 700/245 |
| 2006/0023938 | A1* | 2/2006 | Ban | G01B 21/042 382/153 |

(Continued)

FOREIGN PATENT DOCUMENTS

| CN | 102749334 A | 10/2012 |
| JP | 60195611 A * | 10/1985 |

(Continued)

*Primary Examiner* — Spencer D Patton
(74) *Attorney, Agent, or Firm* — Hauptman Ham, LLP (57) ABSTRACT

A robot system which is inexpensive and can easily measure a position of a target point. The system stores feature quantities of an image of a target mark included in an image acquired as reference data when the target mark is placed at a known first target mark position at the robot coordinate system and stores the first target mark position with respect to an arm tip as the position of the tool center point. The system compares the feature quantities obtained from the image acquired when the target mark is arranged at a second target mark position and the feature quantities of the reference data to make the arm tip move and calculates the second target mark position at the robot coordinate system based on a second robot position corresponding to the position of the arm tip after movement and the position of the tool center point.

4 Claims, 11 Drawing Sheets

(56) References Cited

U.S. PATENT DOCUMENTS

2014/0288710 A1* 9/2014 Ikenaga ............... B25J 9/1697
　　　　　　　　　　　　　　　　　　　　　　　　700/259

FOREIGN PATENT DOCUMENTS

| JP | 2005-201824 A | 7/2005 |
| JP | 2005-342885 A | 12/2005 |
| JP | 2010-117223 A | 5/2010 |
| JP | 2011-048467 A | 3/2011 |

* cited by examiner

ROBOT SYSTEM EQUIPPED WITH CAMERA FOR CAPTURING IMAGE OF TARGET MARK

RELATED APPLICATIONS

The present application claims priority to Japanese Patent Application Number 2015-197715 filed Oct. 5, 2015, the disclosure of which is hereby incorporated by reference herein in its entirety.

BACKGROUND OF THE INVENTION

1. Field of the Invention

The present invention relates to a robot system equipped with a camera capturing an image of a target mark.

2. Description of the Related Art

A robot is sometimes used together with a machine tool for handling a workpiece. To facilitate the manual operation of the robot or to remotely control the robot using a controller of the machine tool, further, it is important to determine the positional relationship between the coordinate system of the machine tool and the coordinate system of the robot.

To determine the positional relationship between the coordinate system of a machine tool and a robot coordinate system, at least three points where the position of the machine tool and the position at the robot coordinate system are known are required. A touchup process bringing the tool center point (TCP) of the robot into physical contact with a predetermined point and measuring the 3D position of that point is known. Further, a method of using a 3D sensor attached to a hand of a robot to measure the 3D position of a predetermined point by a noncontact means is known.

Japanese Patent Publication No. 2011-048467A discloses to utilize a known positional relationship between a robot control point and a set point to find the positional relationship between a robot coordinate system and a coordinate system of a machine tool. Japanese Patent Publication No. 2005-201824A and Japanese Patent Publication No. 2010-117223A disclose using a camera to capture images of a plurality of positions to measure the 3D position of an object.

SUMMARY OF INVENTION

However, in the above-mentioned known art, special devices or expensive 3D sensors have to be used. Alternatively, at the time of measurement, it is necessary to make the robot move across a broad range of at least one of its positions and postures. It is sometimes difficult to make measurements in a restricted space. Therefore, a robot system which is inexpensive and enables easy measurement of the position of a target point has been sought.

According to the present invention, there is provided a robot system including a robot, a camera attached to an arm tip of the robot, and a target mark whose image is captured by the camera, which robot system including a reference date storing part storing a position and size of the target mark included in an image of the camera as reference data and storing a first target mark position for the arm tip as a position of a tool center point when the target mark is arranged at a predetermined first target mark position in a robot coordinate system forming the basis of control of the robot and the arm tip is positioned at a first robot position and a target mark position calculating part making the arm tip move so that a position and size of an image of the target mark included in an image of the camera when the target mark is arranged at a second target mark position match a position and size of the image of the target mark stored as the reference data and using a second robot position corresponding to the position of the arm tip after movement and the position of the tool center point as the basis to calculate the second target mark position at the robot coordinate system.

In a preferred embodiment, the robot system is provided with a machine tool, when a machine coordinate system forming the basis for control of the machine tool is determined in advance and the target mark is arranged at least at three target mark positions not on the same straight line, the target mark position calculating part is configured to calculate the at least three target mark positions at the robot coordinate system, and the robot system further includes a machine coordinate system calculating part using the at least three target mark positions at the machine coordinate system and the at least three target mark positions at the robot coordinate system as the basis to calculate the position of the machine coordinate system with respect to the robot coordinate system.

In a preferred embodiment, the machine tool includes a moving part able to be operated, the target mark is set at the moving part, and the machine tool is configured to make the moving part operate so as to make the target mark move to the at least three target mark positions.

In a preferred embodiment, when a position at the robot coordinate system is unknown and the target mark is arranged at least at three target mark positions not on the same straight line, the target mark position calculating part is configured to calculate the at least three target mark positions at the robot coordinate system, and the robot system further includes a work coordinate calculating part using the at least three target mark positions at the robot coordinate system as the basis to calculate a work coordinate system of the robot.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1:
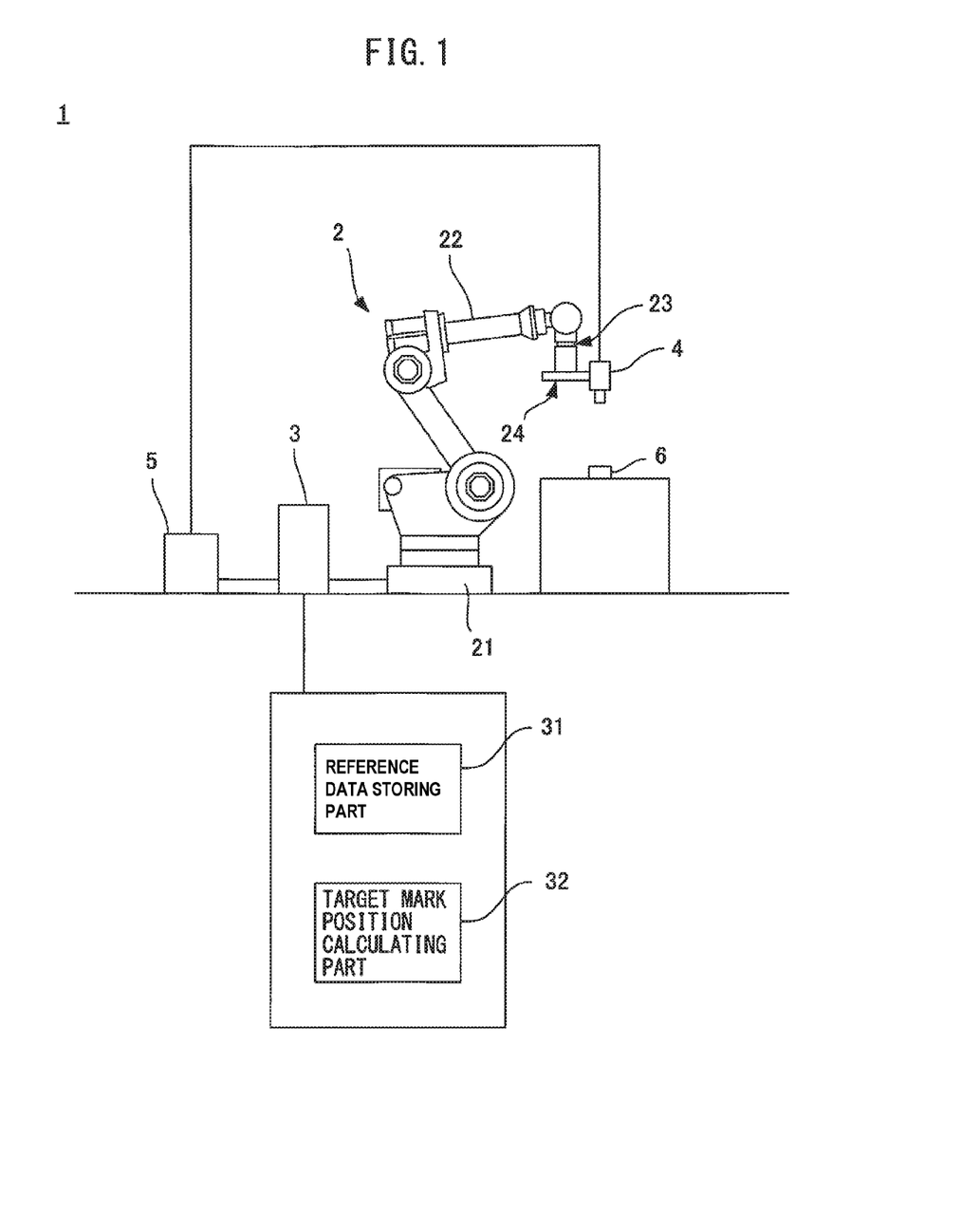
FIG. 1 is a view showing a robot system according to an embodiment.

FIG. 1 shows a robot system 1 according to an embodiment. The robot system 1 includes a robot 2, a robot controller 3 controlling the robot 2, a camera 4 attached to the robot 2, and an image processing apparatus 5. The robot 2 is not limited to a six-axis vertical multi-articulated robot such as shown in FIG. 1 and is a robot having any other known configuration.

The robot 2 includes a base 21 and an arm 22 extending from the base 21. At the arm tip 23 of the robot 2, the camera 4 is attached through a jig 24. Due to this, the position and posture of the camera 4 are changed linked with the arm tip 23 of the robot 2.

The robot controller 3 is a digital computer including a CPU, memory, and interface connected to an outside device. The robot controller 3 imparts commands to drive devices driving the different shafts of the robot 2, for example, servo motors, to thereby control the robot 2 in accordance with an operating program stored in the nonvolatile memory. The robot controller 3 is configured to be able to acquire the position of a hand of the robot 2 at the robot coordinate system forming the basis for the control of the robot 2.

In the operating region of the robot 2 or its vicinity, a target mark 6 is set. The target mark 6 is fastened at a position where its image is able to be captured by a camera 4 moving together with the robot 2.

The target mark 6 is given a characteristic pattern so that the position and size of the image of the target mark 6 can be determined by image processing. For example, the target mark 6 is given a triangular pattern.

The camera 4 is a light receiving device having the function of acquiring an image of an object. The camera 4 is connected to the image processing apparatus 5. The image data captured by the camera 4 is sent to the image processing apparatus 5.

The image processing apparatus 5 is a digital computer including a CPU, memory, and interface connected to an external device. The image processing apparatus 5 is configured to detect the target mark 6 from an image acquired by the camera 4 and calculate the position and size of the target mark 6 on the image from the pattern of the target mark 6.

The image processing apparatus 5 is connected by a communication cable or wireless link to the robot controller 3 and can receive commands from the robot controller 3 or send the robot controller 3 results of the image processing. In another embodiment, the image processing apparatus 5 is built into the robot controller 3.

At the bottom of FIG. 1, a functional block diagram of the robot controller 3 is shown. The robot controller 3 is provided with a reference data storing part 31 and a target mark position calculating part 32.

The reference data storing part 31 stores the position and size of the image of the target mark 6 included in the image of the camera 4 when the target mark 6 is arranged at a predetermined first target mark position at the robot coordinate system Σr forming the basis of control of the robot 2 and the arm tip 23 is positioned at the first robot position as reference data and stores the first target mark position for the arm tip 23 as the position of the tool center point.

The target mark position calculating part 32 makes the arm tip 23 move so that when the target mark 6 is arranged at a second target mark position, the position and size of the image of the target mark 6 included in the image of the camera 4 match the position and size of the image of the target mark 6 stored as reference data and uses the second robot position corresponding to the position of the arm tip 23 after movement and the position of the tool center point as the basis to calculate the second target mark position at the robot coordinate system Σr.

Figure 2:
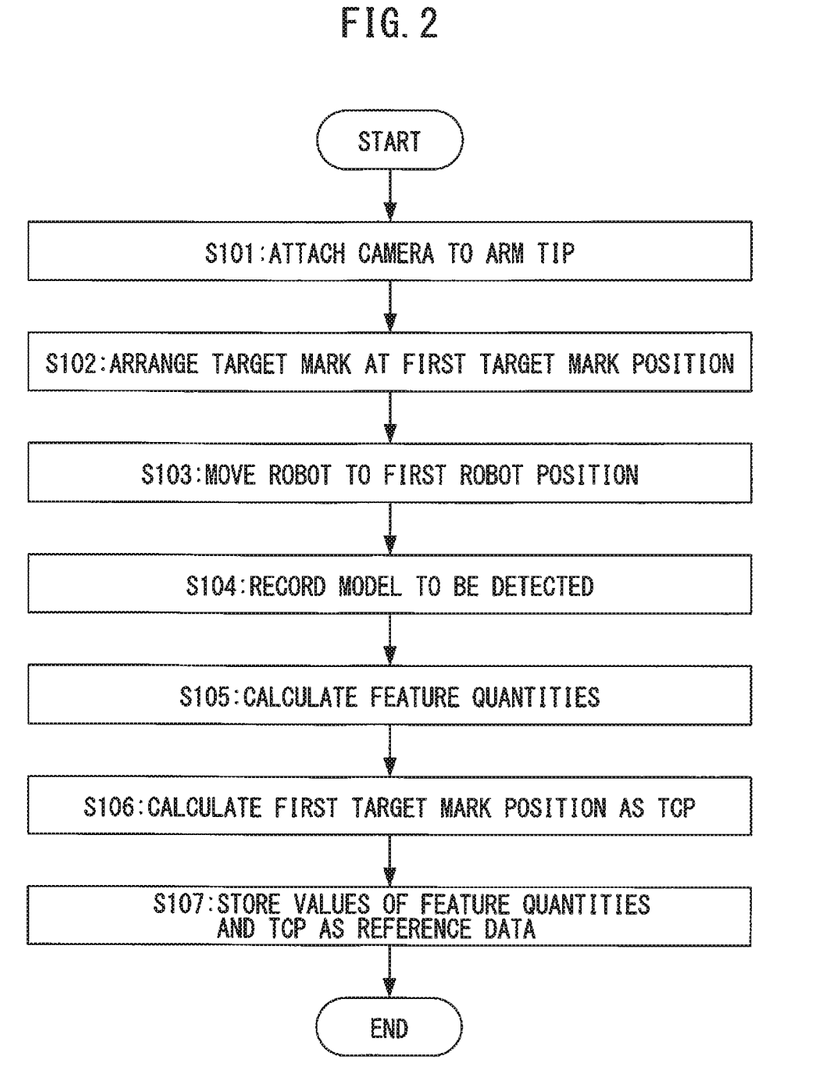
FIG. 2 is a flow chart showing a flow of processing executed according to an embodiment.

Referring to FIG. 2, the initialization performed in the robot system 1 according to one embodiment will be explained. The initialization is performed just once when attaching the camera 4 to the arm tip 23 of the robot 2.

At step S101, the camera 4 is attached to the arm tip 23 of the robot 2. The orientation of the camera 4 with respect to the arm tip 23 is not particularly limited, but the camera 4 is fastened through the jig 24 so that the positional relationship between the camera 4 and arm tip 23 does not change.

At step S102, the target mark 6 is arranged at the first target mark position. The first target mark position may be any position so long as the camera 4 attached to the arm tip 23 can capture an image of the target mark 6.

At step S103, the robot 2 is made to move to a position where the image of the target mark 6 arranged at the first target mark position can be captured (first robot position). The robot 2 may be moved by manual operation of the operator or the robot 2 may be made to automatically move until a predetermined first robot position. The first robot position is preferably a position where the light axis of the camera 4 and the surface of the target mark 6 where the pattern is formed become vertical to each other, but the invention is not limited to this.

At step S104, an image of the target mark 6 is captured by the camera 4 and the pattern of the target mark 6 is recorded as the model for detection. The internal data format of the model recorded at step S104 (below, sometimes simply referred to as the "recorded model") is determined in accordance with the image processing algorithm used in the image processing apparatus 5. For example, template matching utilizing normalized correlation, generalized Hough transform utilizing edge information, and other image processing algorithms can be used, but the invention is not limited to these.

At step S105, the recorded model is utilized to detect the target mark 6 from the image captured by the camera 4 and calculate the feature quantities on the image. In the present embodiment, the feature quantities are the position and size of the pattern of the target mark 6 on the image.

For example, when using template matching using normalized correlation, the position of the template and the ratio of the expansion/contraction of the template when the degree of match of the recorded model and template is the largest are calculated as the feature quantities relating to the position and size.

Figure 3:
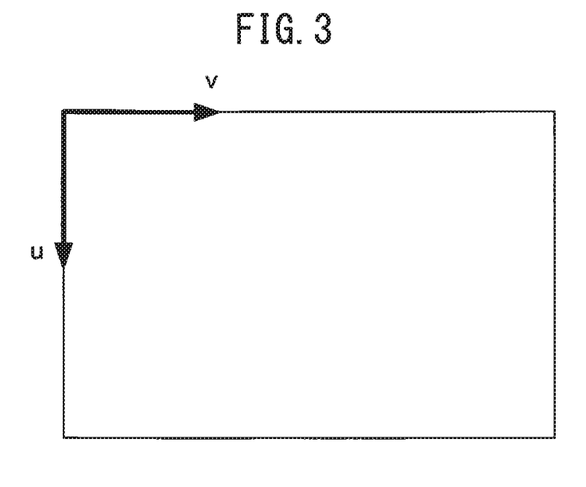
FIG. 3 is a view showing a coordinate system set with respect to an image.

The feature quantities of the position and size on an image are numerical values expressed in the image coordinate system. The image coordinate system is set with respect to the image captured by the camera 4. For example, as shown in FIG. 3, the image coordinate system is a coordinate system having the end point of the image at the top left as the origin, having the downward direction in the image as the u-axis, and having the right direction in the image as the v-axis. In this case, the feature quantity of the position on the image is expressed as the origin position of the recorded model at the image coordinate system. The unit of the feature quantity of the position is the pixel. The origin position of the model may be freely determined, but is inherent to one model.

The feature quantity "s" of the size is, for example, calculated as a ratio with respect to the size of the recorded model as 1.0 (100%). That is, when the size of the detected model is larger than the recorded model, the feature quantity "s" becomes larger than 1.0, while conversely when smaller than the recorded model, the feature quantity "s" becomes smaller than 1.0.

Returning to FIG. 2, at step S106, the 3D position of the first target mark position with respect to the arm tip 23 of the robot 2 is calculated as the tool center point (TCP). To explain the positions of the arm tip 23, target mark 6, and tool center point, the robot coordinate system Σr and wrist coordinate system Σf will be respectively defined.

Figure 4:
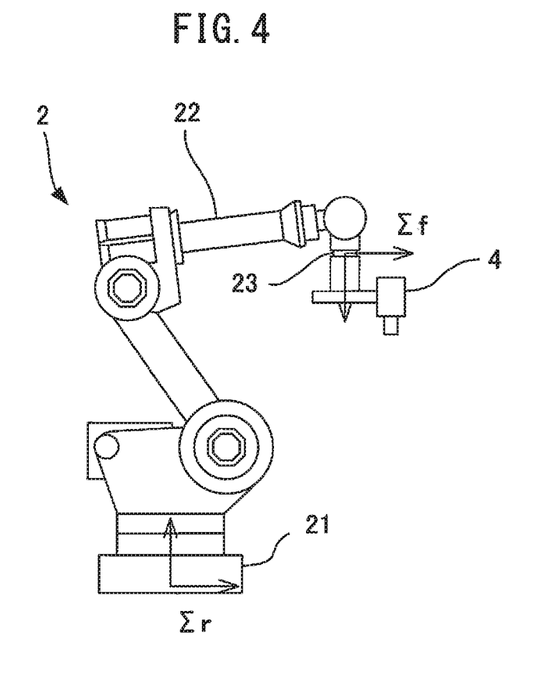
FIG. 4 is a view showing a positional relationship between a robot coordinate system and a wrist coordinate system.

The robot coordinate system Σr is a coordinate system fastened to the base 21 of the robot 2 and forming the basis for control of the robot 2. The wrist coordinate system Σf is a coordinate system fastened to the arm tip 23 and linked with the arm tip 23 (see FIG. 4). The position of the arm tip 23 is expressed as the position of the wrist coordinate system Σf in the robot coordinate system Σr.

Figure 5:
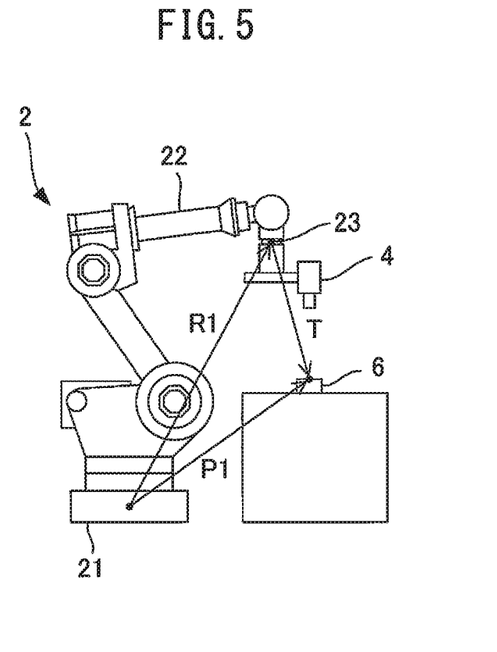
FIG. 5 is a view showing a target mark set at a first target mark position.

In the following explanation, the "position of the tool center point", unless otherwise indicated, means a position in the wrist coordinate system Σf. The position T of the tool center point is found by the following formula (1). Note that, "R1" is the position of the wrist coordinate system Σf in the robot coordinate system Σr, while "P1" is the first target mark position in the robot coordinate system Σr (see FIG. 5).

$$\begin{bmatrix} T \\ 1 \end{bmatrix} = R1^{-1} \cdot \begin{bmatrix} P1 \\ 1 \end{bmatrix} \quad \text{Formula (1)}$$

Note that, "R1" is a 4×4 homogeneous transformation matrix, while "T" and "P1" are $(x,y,z)^T$ 3×1 vectors.

Returning to FIG. 2, at step S107, the set of data including the feature quantity (u,v) of the position and the feature quantity "s" of the size calculated at step S105 and the position T of the tool center point calculated at step S106 is stored as the reference data.

At step S106, the 3D position P1 of the first target mark position at the robot coordinate system Σr was explained as known information, but in another embodiment, the 3D position P1 may be measured by any method. For example, it is also possible to measure the 3D position P1 using a camera in accordance with the method described in Japanese Patent Publication No. 2011-048467A.

Figure 6:
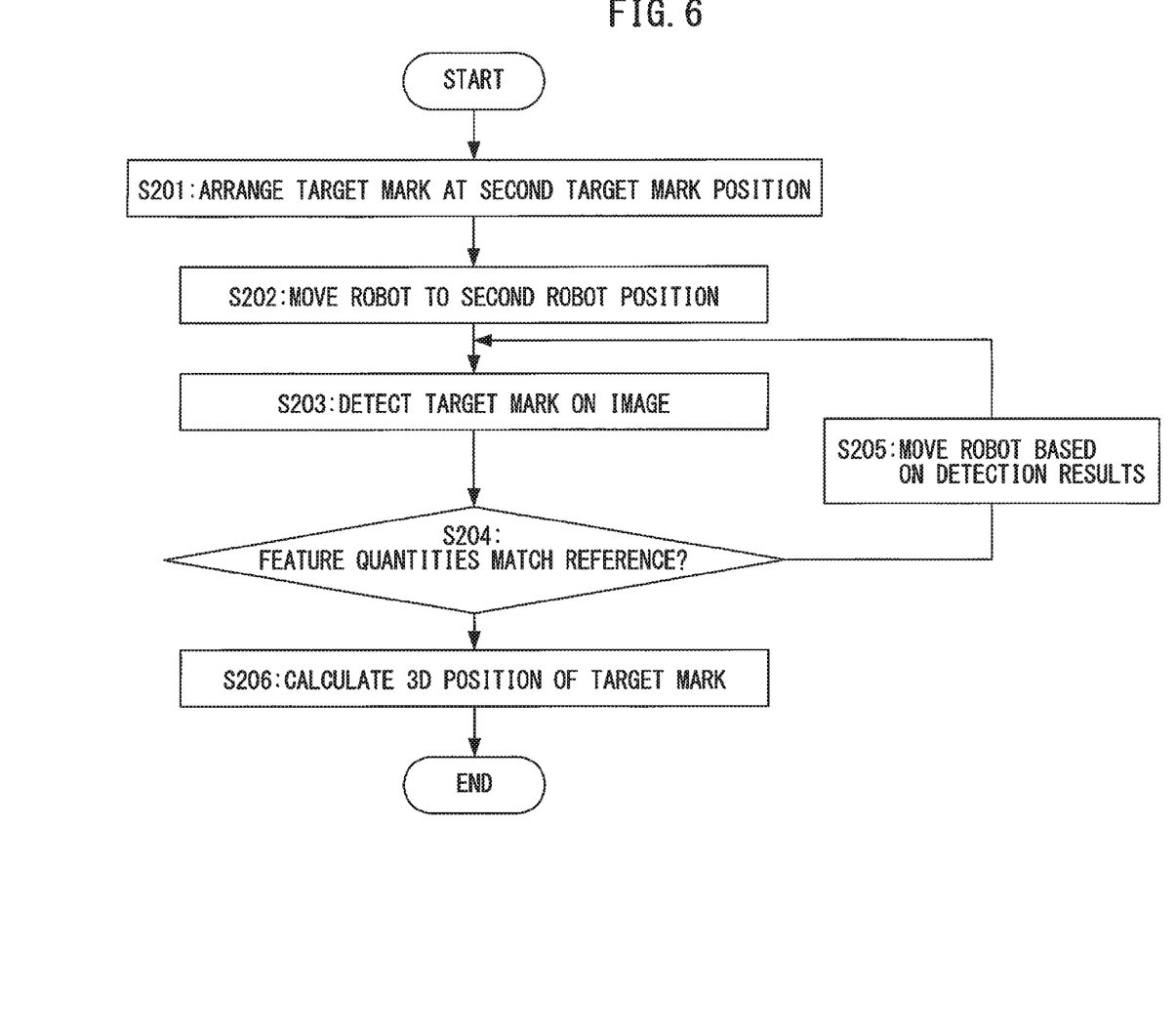
FIG. 6 is a flow chart showing a flow of processing executed according to an embodiment.

Referring to FIG. 6, the method of measuring the 3D position of the target mark 6 arranged at any position will be explained.

Figure 7:
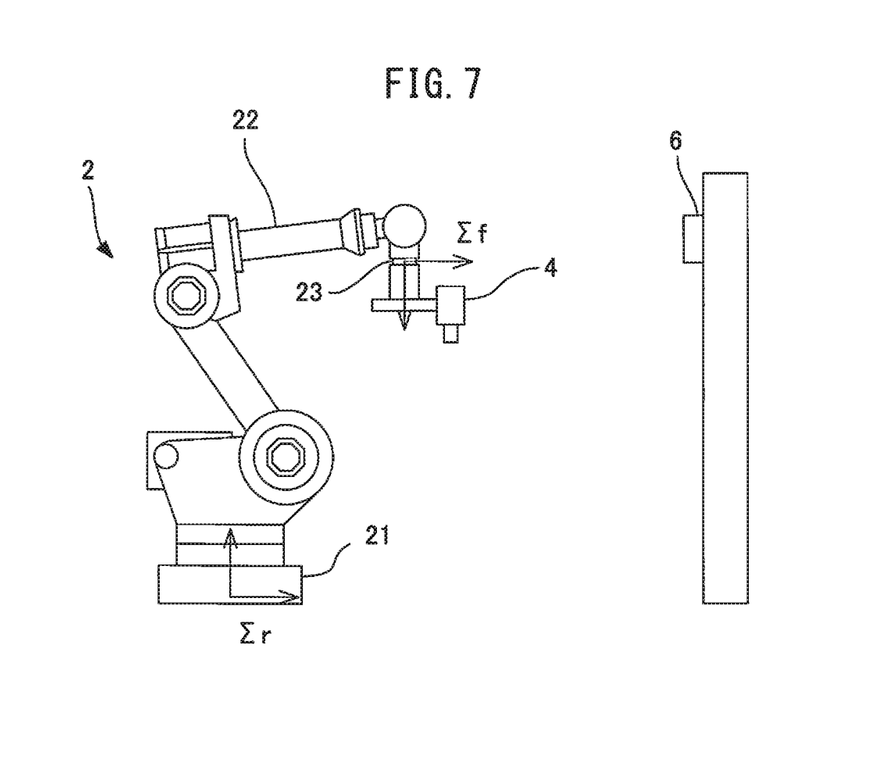
FIG. 7 is a view showing a target mark set at a second target mark position.

At step S201, the target mark 6 is arranged at the second target mark position of the position to be measured (see FIG. 7).

At step S202, the arm tip 23 is made to move to the second robot position where the target mark 6 is included in the field of the camera 4. The robot 2 may be made to move by manual operation of the operator or the robot 2 may automatically move to a predetermined second robot position. At the second robot position, the relative positional relationship between the target mark 6 and the camera 4 need not be that strict so long as the target mark 6 arranged at the second target mark position can be captured by the camera 4.

At step S203, the target mark 6 is detected from the image captured by the camera 4 and the feature quantities relating to the position and size on the image are calculated. At step S203, an image processing algorithm similar to the above-mentioned step S105 can be used.

At step S204, it is judged if the calculated feature quantities and the feature quantities corresponding to the reference data stored at the above-mentioned step S107 match. At step S204, the difference of the two feature quantities $(\Delta u, \Delta v, \Delta s)$ is found by the following formula (2). Note that, "$(u_0, v_0, s_0)$" are the feature quantities stored as the reference data, while "$(u_1, v_1, s_1)$" are the feature quantities calculated at step S203.

$$\Delta u = u_1 - u_0 \quad \text{Formula (2)}$$
$$\Delta v = v_1 - v_0$$
$$\Delta s = \frac{1}{s_1} - \frac{1}{s_0}$$

Figure 8:
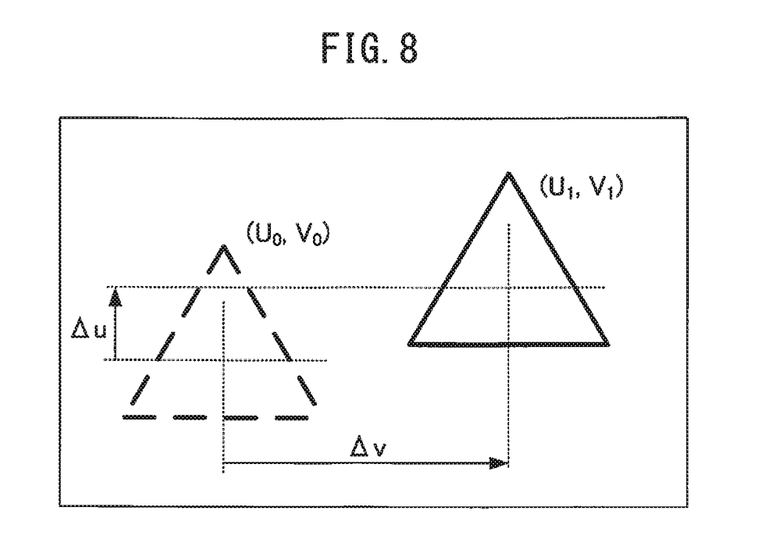
FIG. 8 is a view showing a positional relationship and difference of feature quantities of an image.

FIG. 8 shows the positional relationship of the image and the difference of the feature quantities $(\Delta u, \Delta v)$. The target mark 6 on the image when capturing an image of the target mark 6 arranged at the first target mark position from the first robot position by the camera 4 is shown by the broken line. The target mark 6 on the image when capturing an image of the target mark 6 arranged at the second target mark position from the second robot position by the camera 4 is shown by the solid line.

The feature quantity "s" relating to the size of the target mark 6 is inversely proportional to the distance between the target mark 6 and the camera 4. Therefore, in formula (2), the reciprocal of the feature quantity "s" is used.

When the threshold value used for judgment of the position is 0.1 pixel, if the length of $(\Delta u, \Delta v)$ is less than 0.1 pixel, it is judged that the two target marks 6 are arranged at the same position on the image. When the threshold value used for judgment of the size is 0.1 pixel, if Δs is −0.1 to 0.1 in range, the two target marks 6 have the same sizes on the image.

If the result of judgment at step S204 is NO (at least one of the position and size do not match), the routine proceeds to step S205 where the robot 2 is made to move so that the difference of the feature quantities $(\Delta u, \Delta v, \Delta s)$ becomes smaller. The method of calculating the amount of movement of the robot 2 from the difference of the feature quantities $(\Delta u, \Delta v, \Delta s)$ is not particularly limited, but one example will be explained later.

If the result of judgment at step S204 is YES, the routine proceeds to step S206 where the 3D position of the second target mark position at the robot coordinate system Σr is calculated. According to the present embodiment, at step S204, it is confirmed that the feature quantities detected from the image match the feature quantities at the reference data. For this reason, the positional relationship between the position of the arm tip 23 of the robot 2 and the second target mark position is the same as the positional relationship between the position of the arm tip 23 when the arm tip 23 is positioned at the first robot position and the first target mark position is the same.

Figure 9:
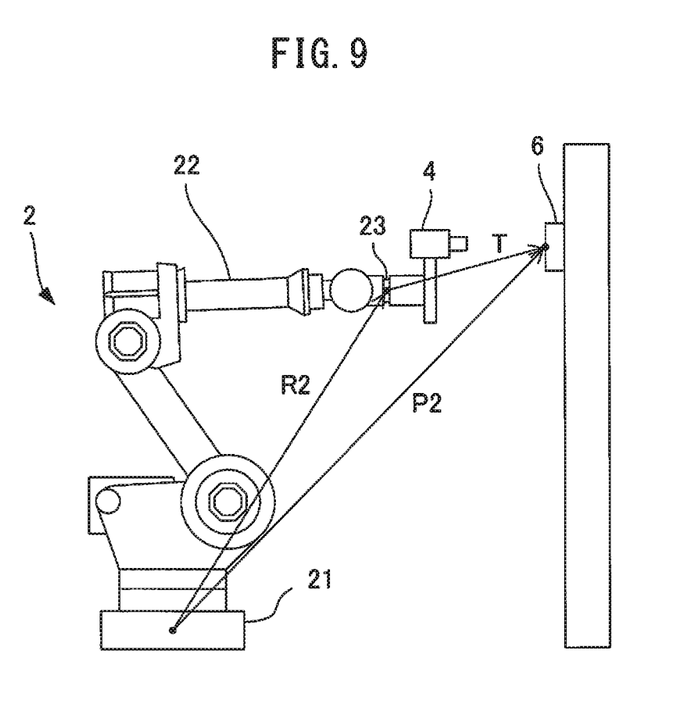
FIG. 9 is a view showing a target mark set at a second target mark position.

Therefore, the 3D position P2 of the second target mark position at the robot coordinate system Σr is expressed by the next formula (3). "R2" is the position of the wrist coordinate system Σf at the robot coordinate system Σr when the arm tip 23 is positioned at the second robot position. "T" is the value of the tool center point (TCP) stored as reference data (see FIG. 9).

$$\begin{bmatrix} P2 \\ 1 \end{bmatrix} = R2 \cdot \begin{bmatrix} T \\ 1 \end{bmatrix} \quad \text{Formula (3)}$$

"R2" is a 4×4 homogeneous transformation matrix, while "T" and "P2" are $(x,y,z)^T$ 3×1 vectors.

In the example shown in FIG. 6, to improve the precision, after the processing of step S205, the processing of step S203 and step S204 is again performed. However, in another embodiment, the robot 2 is made to move by exactly the amount of movement of the robot 2 calculated from the difference of the feature quantities (Δu, Δv, Δs), then, without returning to step S203, the routine directly may proceed to step S206.

At step S205, as an example of calculation of the amount of movement of the robot 2, the method of using a Jacobian matrix will be explained.

First, the relationship between the difference of the feature quantities (Δu,Δv,Δs) and the amount of movement (Δx,Δy,Δz) of the robot 2 will be defined using the Jacobian matrix J by the following formula (4). The Jacobian matrix J is a square matrix of size 3×3.

$$\begin{bmatrix} \Delta x \\ \Delta y \\ \Delta z \end{bmatrix} = J \begin{bmatrix} \Delta u \\ \Delta v \\ \Delta s \end{bmatrix} \quad \text{Formula (4)}$$

Therefore, if the Jacobian matrix J is known, it is possible to calculate the amount of movement (Δx,Δy,Δz) of the robot 2 from the difference of the feature quantities (Δu,Δv,Δs).

Next, the method of finding the Jacobian matrix J will be explained. The process of finding the Jacobian matrix need only be performed once at the time of initialization after attaching the camera 4 to the arm tip 23 of the robot 2.

The target mark 6 is arranged at any position and the position of the robot 2 where the target mark 6 is positioned near the image center is made the original position. For example, when the target mark 6 is arranged at the first target mark position, the first robot position may be made the original position.

In the state where the arm tip 23 is positioned at the original position, the target mark 6 is detected from the image captured by the camera 4 and the feature quantities $(u_i, v_i, s_i)$ are calculated.

Next, the arm tip 23 is made to move by exactly the distance "m" in the X-axial direction of the wrist coordinate system Σf. The target mark 6 is detected from the image captured by the camera 4 at the position after movement and the feature quantities $(u_x, v_x, s_x)$ are calculated.

Similarly, the feature quantities $(u_y, v_y, s_y)$ and $(u_z, v_z, s_z)$ are calculated from the image captured after making the arm tip 23 move from the original position in the Y-axial direction and Z-axial direction of the wrist coordinate system Σf by respectively exactly the distances "m".

The results of detection of the target mark 6 when making the robot 2 move in the X-axial direction, Y-axial direction, and Z-axial direction and the results of detection of the target mark 6 at the original position are used as the basis to calculate the difference of the feature quantities in accordance with the next formulas (5) to (7):

$$\Delta u_x = u_x - u_i \quad \text{Formula (5)}$$
$$\Delta v_x = v_x - v_i$$
$$\Delta s_x = \frac{1}{s_x} - \frac{1}{s_i}$$

$$\Delta u_y = u_y - u_i \quad \text{Formula (6)}$$
$$\Delta v_y = v_y - v_i$$
$$\Delta s_y = \frac{1}{s_y} - \frac{1}{s_i}$$

$$\Delta u_z = u_z - u_i \quad \text{Formula (7)}$$
$$\Delta v_z = v_z - v_i$$
$$\Delta s_z = \frac{1}{s_z} - \frac{1}{s_i}$$

If entering formulas (5) to (7) into formula (4), it is possible to find the Jacobian matrix J from the following formula (8):

$$\begin{bmatrix} m & 0 & 0 \\ 0 & m & 0 \\ 0 & 0 & m \end{bmatrix} = J \begin{bmatrix} \Delta u_x & \Delta u_y & \Delta u_z \\ \Delta v_x & \Delta v_y & \Delta v_z \\ \Delta s_x & \Delta s_y & \Delta s_z \end{bmatrix} \quad \text{Formula (8)}$$

$$J = \begin{bmatrix} m & 0 & 0 \\ 0 & m & 0 \\ 0 & 0 & m \end{bmatrix} \begin{bmatrix} \Delta u_x & \Delta u_y & \Delta u_z \\ \Delta v_x & \Delta v_y & \Delta v_z \\ \Delta s_x & \Delta s_y & \Delta s_z \end{bmatrix}^{-1}$$

Figure 10:
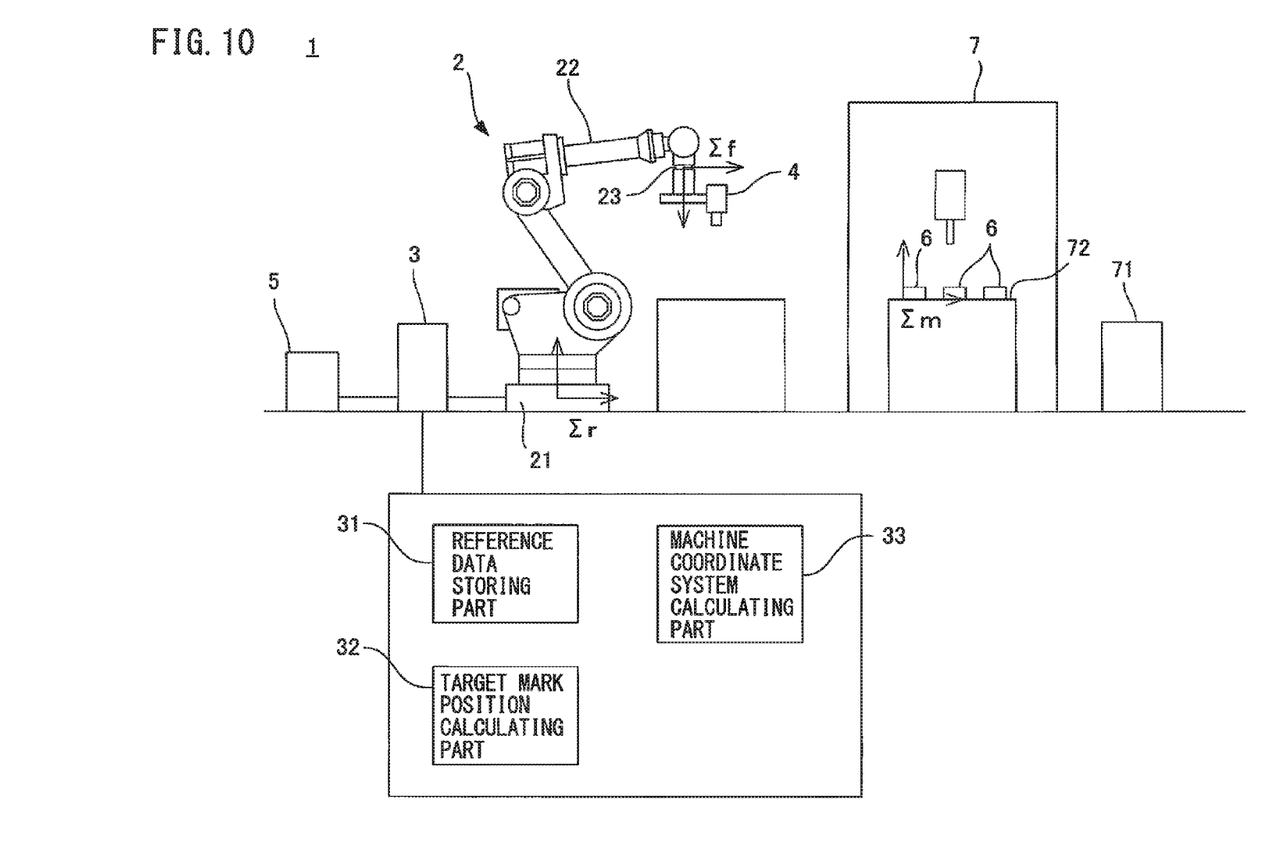
FIG. 10 is a view showing a robot system according to another embodiment.

Next, the measurement method according to the above-mentioned embodiment will be utilized to explain the method of setting the coordinate system of a machine tool. The robot system 1 according to this embodiment further includes, in addition to the configuration shown in FIG. 1, a machine tool 7 and machine tool controller 71 (see FIG. 10). Further, as shown in FIG. 10, three target marks 6 are placed on a table 72 of the machine tool 7.

In the same way as the above-mentioned embodiment, the robot coordinate system Σr and wrist coordinate system Σf are respectively defined. Further, in the present embodiment, as shown in FIG. 10, the machine coordinate system Σm forming the basis for control of the machine tool 7 is defined.

In the present embodiment, the robot controller 3 further includes a machine coordinate system calculating part 33. The machine coordinate system calculating part 33 uses the at least three target mark positions at the machine coordinate system Σm and at least three target mark positions at the robot coordinate system Σr as the basis to calculate the position of the machine coordinate system Σm with respect to the robot coordinate system Σr.

The table 72 of the machine tool 7 is configured to enable three target marks 6 to be arranged at positions whose 3D positions at the machine coordinate system Σm are known. For example, the target marks 6 are arranged at predetermined positions by positioning pins. If it is possible to reproduce the arrangement of the target marks 6, when using additional robots or when replacing robots, there is the advantage that the resetting can be realized more simply.

Note that, the three target marks 6 are preferably positioned so as not to be arranged on a straight line.

The machine tool controller 71 is connected to the robot controller 3. The positions of the target marks 6 at the machine coordinate system Σm are transmitted to the robot controller 3 according to need.

Figure 11:
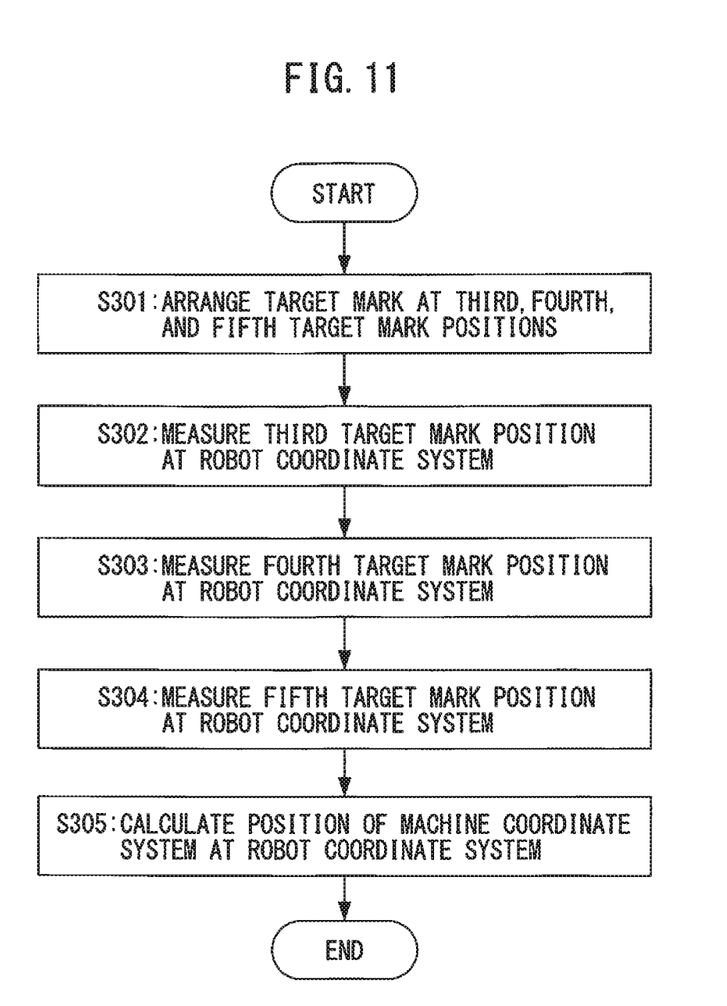
FIG. 11 is a flow chart showing a flow of processing executed according to an embodiment.

Referring to FIG. 11, the process of setting a coordinate system matching the machine coordinate system Σm at the robot 2 will be explained. Note that, the above-mentioned initialization is considered ended.

At step S301, the three target marks are arranged at the third, fourth, and fifth target mark positions. The third, fourth, and fifth target mark positions Q3, Q4, and Q5 at the machine coordinate system Σm are known.

At step S302, the third target mark position P3 in the robot coordinate system Σr is measured in accordance with the processing of steps S202 to S206 explained with reference to FIG. 6.

At step S303, the fourth target mark position P4 in the robot coordinate system Σr is measured in accordance with the processing of steps S202 to S206 explained with reference to FIG. 6.

At step S304, the fifth target mark position P5 in the robot coordinate system Σr is measured in accordance with the processing of steps S202 to S206 explained with reference to FIG. 6.

At step S305, the third, fourth, and fifth target mark positions Q3, Q4, Q5 at the machine coordinate system Σm and the third, fourth, and fifth target mark positions P3, P4, P5 at the robot coordinate system Σr are used as the basis to calculate the position of the machine coordinate system Σm at the robot coordinate system Σr.

One example of the method of calculation performed at step S305 will be explained. In the following explanation, the position of the machine coordinate system Σm at the robot coordinate system Σr will be designated as "M". "M" is a 4×4 homogeneous transformation matrix.

A target mark coordinate system Σt is defined for a plane including the third, fourth, and fifth target mark position. The target mark coordinate system Σt is set having the third target mark position as its origin, having the direction from the third target mark position toward the fourth target mark position as the "X-axial direction", and having the plane including the third, fourth, and fifth target mark positions as the "XY plane".

If the position of the target mark coordinate system Σt at the coordinate system of the robot "Σr" is made "Tr", the "Tr" of the 4×4 homogeneous transformation matrix is calculated from the following formula (9).

$$Vx = (P4 - P3)/|P4 - P3|$$ Formula (9)

$$Vt = (P5 - P3)/|P5 - P3|$$

$$Vz = Vx \times Vt$$

$$Vy = Vz \times Vx$$

$$Tr = \begin{bmatrix} Vx & Vy & Vz & P3 \\ 0 & 0 & 0 & 1 \end{bmatrix}$$

If the position of the target mark coordinate system Σt at the machine coordinate system Σm is made "Tm", the "Tm" of the 4×4 homogeneous transformation matrix can be calculated from the following formula (10).

$$Wx = (Q4 - Q3)/|Q4 - Q3|$$ Formula (10)

$$Wt = (Q5 - Q3)/|Q5 - Q3|$$

$$Wz = Wx \times Wt$$

$$Wy = Wz \times Wx$$

$$Tm = \begin{bmatrix} Wx & Wy & Wz & Q3 \\ 0 & 0 & 0 & 1 \end{bmatrix}$$

Here, Tr=M·Tm stands, so M=Tr·Tm$^{-1}$.

When the table 72 of the machine tool 7 can move translationally in two axial directions and can rotate about one axis, the table 72 can be operated to make one target mark 6 move to three respectively different positions to thereby acquire the above-mentioned third, fourth, and fifth target mark positions. In this case, when the position of the target mark 6 with respect to the table 72 is a position which is uniquely determined by the specifications of the machine tool 7, the position of the target mark 6 at the machine coordinate system Σm can be calculated from the position of the table 72. Alternatively, a touch probe etc. can be used to measure the position of the target mark 6 at the machine coordinate system Σm.

Next, referring to FIG. 12 and FIG. 13, a method of setting a new coordinate system at the robot 2 will be explained. The new coordinate system is used as the work coordinate system Σc in predetermined work performed by the robot 2. The robot system 1 used in this case is similar in configuration to that shown in FIG. 1, but three target marks 6 are used and the robot controller 3 further includes a work coordinate system calculating part 34 (see FIG. 13).

The work coordinate system calculating part 34 uses at least three target mark positions at the robot coordinate system Σr as the basis to calculate a work coordinate system Σc of the robot 2.

Figure 12:
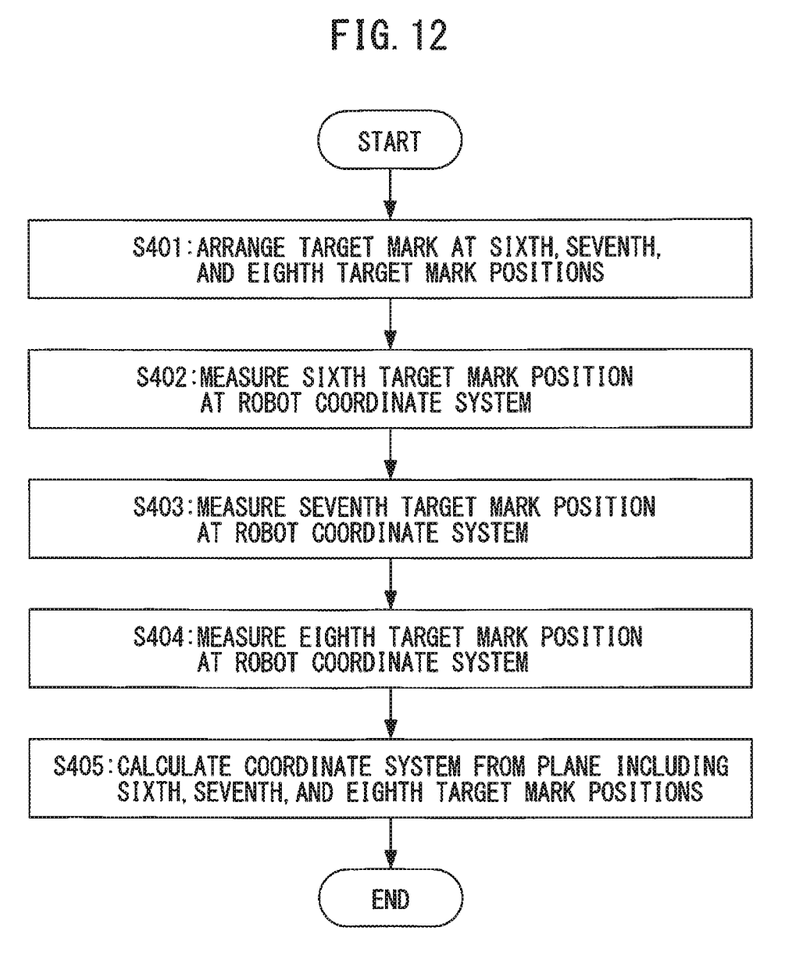
FIG. 12 is a flow chart showing a flow of processing executed according to an embodiment.
Figure 13:
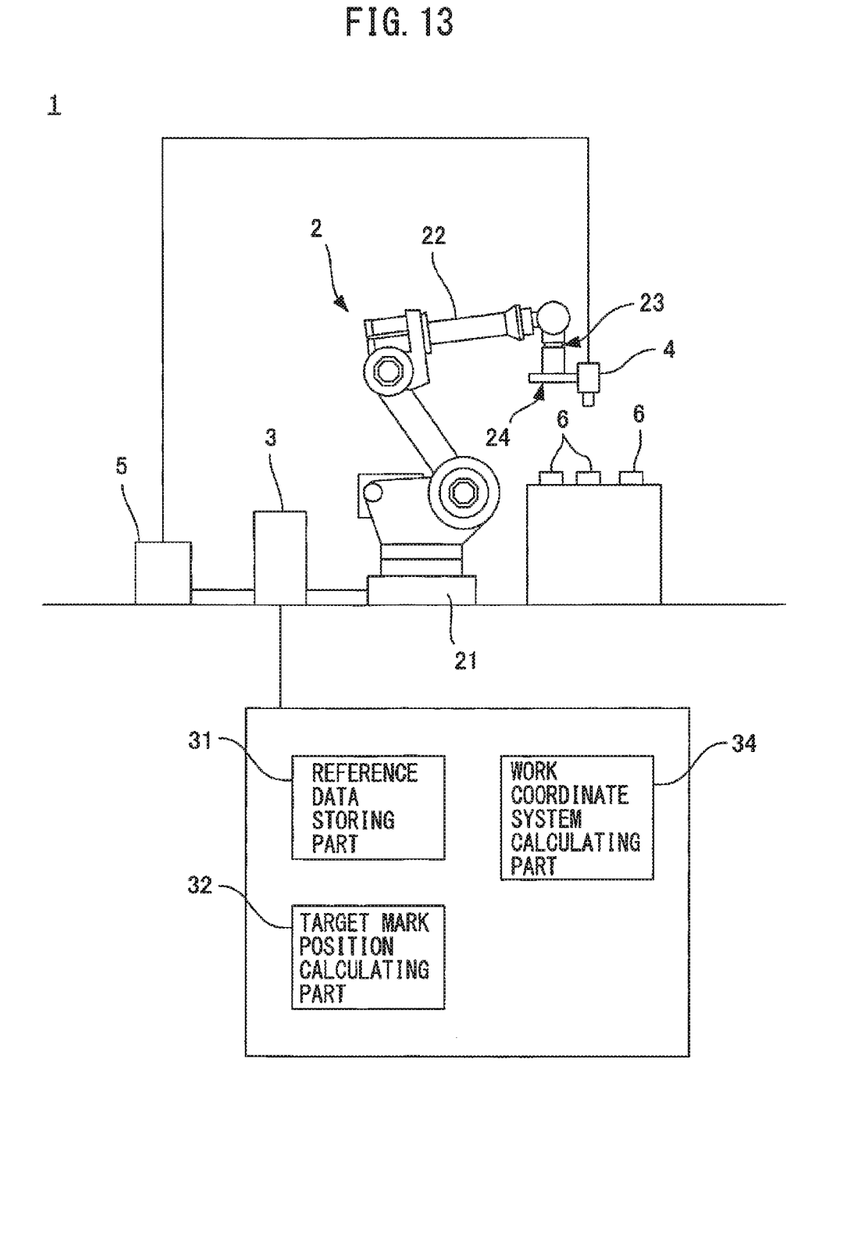
FIG. 13 is a view showing a robot system according to still another embodiment.

As shown in FIG. 12, at step S401, the target mark 6 is set at the sixth, seventh, and eighth target mark positions corresponding to the positions where the work coordinate system Σc is desired to be set.

At step S402, the sixth target mark position P6 in the robot coordinate system Σr is measured in accordance with the processing of steps S202 to S206 explained with reference to FIG. 6.

At step S403, the seventh target mark position P7 in the robot coordinate system Σr is measured in accordance with the processing of steps S202 to S206 explained with reference to FIG. 6.

At step S404, the eighth target mark position P8 in the robot coordinate system Σr is measured in accordance with the processing of steps S202 to S206 explained with reference to FIG. 6.

At step S405, the sixth, seventh, and eighth target mark positions P6, P7, and P8 at the robot coordinate system Σr are used as the basis to calculate the position C of the newly set work coordinate system Σc.

One example of the method of calculating the position C of the work coordinate system Σc at step S405 will be explained.

The work coordinate system Σc is set with respect to the plane including the sixth, seventh, and eighth target mark positions. The work coordinate system Σc has the sixth target mark position as its origin, has the direction from the sixth target mark position toward the seventh target mark position as the X-axial direction, and has the plane including the sixth, seventh, and eighth target mark positions as the XY plane. In this case, a position C of the work coordinate system Σc can be calculated from the following formula (11). Note that, the position C is a 4×4 homogeneous transformation matrix.

$$Vx = (P7 - P6)/|P7 - P6|$$ Formula (11)

$$Vt = (P8 - P6)/|P8 - P6|$$

$$Vz = Vx \times Vt$$

$$Vy = Vz \times Vx$$

$$C = \begin{bmatrix} Vx & Vy & Vz & P6 \\ 0 & 0 & 0 & 1 \end{bmatrix}$$

Note that, the camera 4 and target mark 6 may be temporarily used when performing the processing of the above-mentioned embodiment and may be detached as required after finishing the processing. According to the robot system 1 according to the present embodiment, the following advantageous effects can be exhibited:

(1) There is no need to calibrate the camera 4 in advance. Therefore, the work efficiency can be improved.

(2) The camera 4 used in the present embodiment may be a single 2D camera. That is, it is possible to measure the 3D position of the target mark 6 without the need for stereo measurement, so an inexpensive robot system 1 can be provided.

(3) It is possible to measure the 3D position of the target mark 6 even if the operating region of the robot 2 is restricted such as in the case of use together with the machine tool 7.

(4) A coordinate system corresponding to the machine coordinate system Σm set for the machine tool 7 is set at the robot 2, so the positional information is shared between the machine tool 7 and robot 2.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the robot system according to the present invention, there is no need to calibrate the camera in advance. Further, it is possible to use an inexpensive 2D camera to measure a 3D position of a target mark. Due to this, it is possible to determine the positional relationship between the robot coordinate system and coordinate system of a machine tool inexpensively and by a simple method.

What is claimed is:

1. A robot system, comprising:
   a robot having an arm tip;
   a target mark;
   a camera attached to the arm tip of the robot, and configured to capture an image of the target mark; and
   a robot controller configured to
      store a position and size of the image of the target mark included in an image captured by the camera as reference data,
      store a first target mark position with respect to the arm tip as a position of a tool center point when the target mark is arranged at the first target mark position determined in advance in a robot coordinate system forming the basis of control of the robot and the arm tip is positioned at a first robot position,
      control the arm tip to perform a movement so that a position and size of the image of the target mark included in the image of the camera when the target mark is arranged at a second target mark position match the position and size of the image of the target mark stored as the reference data, and
      use a second robot position, which is the position of the arm tip after said movement, and the position of the tool center point as the basis to calculate the second target mark position in the robot coordinate system.

2. The robot system according to claim 1, wherein
   the robot system further comprises a machine tool,
   when the target mark is arranged at any of at least three target mark positions that are determined in advance in a machine coordinate system forming the basis for control of the machine tool and that do not exist on the same straight line, the robot controller is configured to calculate the at least three target mark positions each at the robot coordinate system, and
   the robot controller is further configured to use the at least three target mark positions at the machine coordinate system and the at least three target mark positions at the robot coordinate system as the basis to calculate the position of the machine coordinate system with respect to the robot coordinate system.

3. The robot system according to claim 2, wherein
   the machine tool includes an operable moving portion,
   the target mark is set at the moving portion, and
   the machine tool is configured to make the moving portion operate so as to make the target mark move to the at least three target mark positions.

4. The robot system according to claim 1, wherein
   when the target mark is arranged at least at three target mark positions that do not exist on the same straight line and that are unknown at the robot coordinate system, the robot controller is configured to calculate the at least three target mark positions at the robot coordinate system,
   the robot controller is further configured to use the at least three target mark positions at the robot coordinate system as the basis to calculate a work coordinate system of the robot,
   the work coordinate system is different from the robot coordinate system and used in predetermined work performed by the robot,
   positions where the work coordinate system is to be set correspond to the at least three target mark positions, and
   the robot controller is configured to calculate the work coordinate system with respect to a plane including the at least three target mark positions.

* * * * *